United States Patent [19]

Bunn

[11] Patent Number: 6,055,900
[45] Date of Patent: May 2, 2000

[54] FUNNEL SPLASH GUARD

[75] Inventor: Arthur H. Bunn, Springfield, Ill.

[73] Assignee: Bunn-O-Matic Corporation, Springfield, Ill.

[21] Appl. No.: 09/289,236

[22] Filed: Apr. 9, 1999

[51] Int. Cl.[7] .................................................. A47J 31/00
[52] U.S. Cl. ................................ 99/279; 99/304; 99/306
[58] Field of Search ............................... 99/306, 304, 279

[56] References Cited

U.S. PATENT DOCUMENTS

| Re. 34,473 | 12/1993 | Ryan | ........................................ 99/306 |
|---|---|---|---|
| 2,174,228 | 9/1939 | Perkins . | |
| 3,943,058 | 3/1976 | Wurm . | |
| 4,414,884 | 11/1983 | McLean | ................................... 99/304 |
| 4,999,470 | 3/1991 | Fuchs, Jr. . | |
| 5,064,533 | 11/1991 | Anson . | |
| 5,590,581 | 1/1997 | Strub et al. . | |
| 5,865,095 | 6/1999 | Mulle | ........................................ 99/304 |

*Primary Examiner*—Keith D. Hendricks
*Assistant Examiner*—Drew Becker
*Attorney, Agent, or Firm*—Trexler, Bushnell, Giangiorgi & Blackstone, Ltd.

[57] ABSTRACT

The present invention provides a novel splash guard which is positioned in a brewing funnel in close proximity to the handle of the funnel. The splash guard is a curved structure which extends over a portion of the mouth of the brewing funnel. The splash guard extends over a portion of the mouth of the brewing funnel, but not to such an extent as to interfere with the spraying of water into the brewing funnel, or the placing of filter supports, filters or brewing substance into the brewing funnel. The splash guard functions to deflect a slurry of water, brewing substance and brewed beverage in the funnel which is displaced toward the handle, and to direct the slurry back into the funnel instead of splashing out of the brewing funnel.

13 Claims, 2 Drawing Sheets

FUNNEL SPLASH GUARD

BACKGROUND OF THE INVENTION

This invention relates to a funnel splash guard for use in brewing funnels which can retain either a brewing substance or a combination of a filter and a brewing substance for infusion with heated water to produce a liquid brewed beverage.

Common beverage brewing funnels along with filter supports are used to support filter papers or permanent filters containing a brewing substance, such as tea or ground coffee. Typically, a brewing funnel is supported by a brewing apparatus so that heated water can be sprayed over the brewing substance to infuse the substance and produce a liquid brewed beverage. The brewed beverage drains from the bottom of the funnel and into a carafe or pot positioned therebelow.

Brewing funnels normally should remain in the brewing apparatus throughout the brewing cycle until all of the brewed beverage has drained therefrom. However, it may be possible for a user to remove the brewing funnel from the brewing apparatus prior to the complete draining of the brewed beverage from the brewing funnel. When this occurs, a slurry of the heated water, brewing substance and brewed beverage retained in the funnel may splash out of the funnel when the funnel is removed. Commonly, brewing funnels have a handle which is held by the user's hand when putting the brewing funnel in or removing it from the brewing apparatus. If the brewing funnel is removed from the brewing apparatus when all of the liquid brewed beverage has not fully drained from the brewing funnel, the slurry of liquid brewed beverage and moist brewing substance can develop a degree of momentum which moves it toward the handle of the funnel as it is removed. The slurry may splash out of the funnel and onto the user's hand if the user acts without caution.

OBJECTS AND SUMMARY OF THE INVENTION

An object of the present invention is to position the splash guard proximally to the handle positioned on the brewing funnel so that when the brewing funnel is removed by a user while a slurry of hot water, brewing substance and brewed beverage is still in the brewing funnel, the slurry will be retained in the brewing funnel.

Another object of the present invention is to position the splash guard on the brewing funnel so that the splash guard does not interfere with the placement of the brewing funnel into the brewing apparatus.

Another object of the present invention is to provide a splash guard that does not interfere with the spraying of water into the mouth of the brewing funnel by the brewing apparatus.

Another object of the present invention is to provide a splash guard that does not interfere with the user's ability to place a filter support, a filter and brewing substance into the mouth of the brewing funnel.

Another object of the present invention is to provide a splash guard which is easy to clean.

Yet another object of the present invention is to provide a brewing funnel with a splash guard that has no extra parts to lose, clean, increase expense, or to break or replace.

Briefly, and in accordance with the foregoing, the present invention provides a novel splash guard which is positioned in a brewing funnel in close proximity to the handle of the funnel. The splash guard is a curved structure which extends over a portion of the mouth of the brewing funnel. The splash guard does not extend over a portion of the mouth to such an extent as to interfere with the spraying of water into the brewing funnel, nor does it interfere with placing filter supports, filters or brewing substance into the brewing funnel. The splash guard can either be removable or permanently attached to the brewing funnel. If necessary, multiple or enlarged splash guards may be used in the event that more than one handle is attached to a brewing funnel. The splash guard functions to direct and contain a slurry of hot water, brewing substance and brewed beverage which may be traveling toward the handle to be deflected back into the funnel.

BRIEF DESCRIPTION OF THE DRAWINGS

The features of the present invention which are believed to be novel are set forth with particularity in the appended claims. The organization and manner of the structure and operation of the invention, together with further objects and advantages thereof, may best be understood by reference to the following description taken in connection with the accompanying drawings wherein like reference numerals identify like elements in which:

DETAILED DESCRIPTION OF THE ILLUSTRATED EMBODIMENTS

Figure 1:
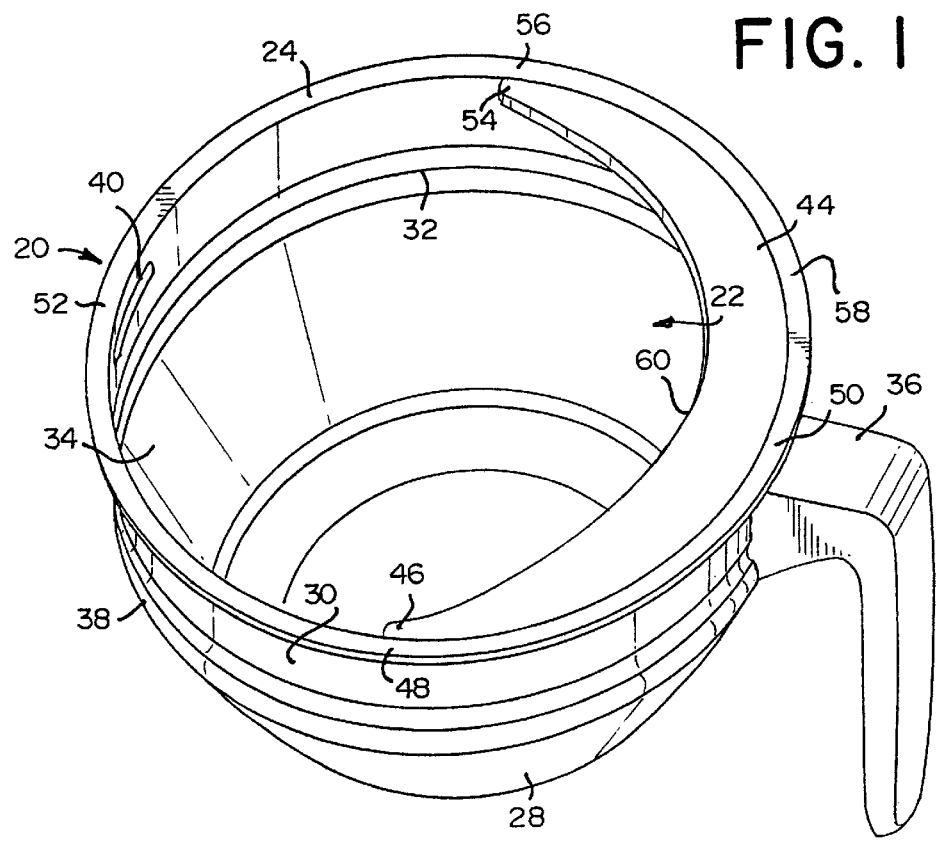
FIG. 1 is a perspective view of a beverage brewing funnel showing a splash guard attached to a lip of the beverage brewing funnel, proximate to a handle of the funnel.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

A beverage brewing funnel 20 is shown in FIG. 1. The brewing funnel 20 has a generally frustroconical shape with a mouth 22 which is defined by an annular lip or rim 24, and a drain aperture 26 formed in a bottom surface 28 thereof. A to sidewall 30 generally continuously extends around the brewing funnel 20 between the annular lip 24 and the bottom surface 28. An annular groove 32 is formed along an inside surface 34 of the brewing funnel 20. A handle 36 is also provided for on the outside surface 38 of the sidewall 30. A slot 40 and a hole (not shown) are formed through the sidewall 30 of the brewing funnel 20 for attachment of a filter support 42.

Attached to the brewing funnel 20 is a splash guard 44. The splash guard 44 is formed of a piece of material that is resistant to moisture and heat, such as the material from which the funnel is formed or any other suitable material. It is envisioned that the splash guard 44 can either be permanently affixed to the brewing funnel 20 or that it can be easily removable from the brewing funnel 20. If the splash guard 44 is permanently attached to the brewing funnel 20, the splash guard 44 is formed in the same molding as that of the brewing funnel 20, thereby making the splash guard 44 an extension of the brewing funnel 20. If, however, the splash guard 44 is desired to be easily removable from the brewing funnel 20, the splash guard 44 would have some means, i.e., screws, rivets, tabs, or the like, for attaching it to the brewing funnel 20 through recesses in the brewing funnel 20. The removability of the splash guard 44 would allow for easy cleaning of both the splash guard 44 and the brewing funnel 20.

Figure 2:
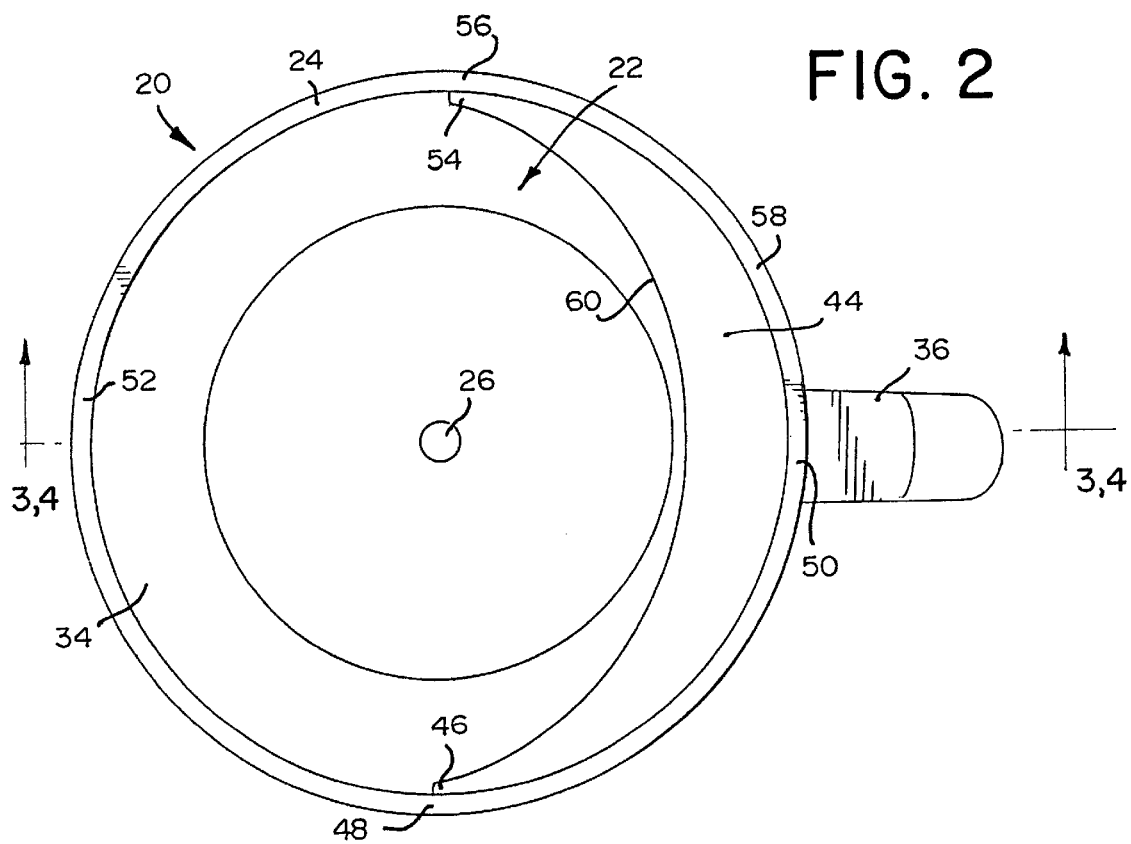
FIG. 2 is a top view of the beverage brewing funnel showing the splash guard attached to the lip of the beverage brewing funnel, proximate to a handle of the funnel.

As best illustrated in FIG. 2, a first end 46 of the splash guard 44 is positioned along the annular lip 24 of the brewing funnel 20 at a position 48. Position 48 is generally equidistant from the side 50 of the brewing funnel 20 where the handle 36 is attached and from the side 52 of the brewing funnel 20 opposite of where the handle 36 is attached. A second end 54 of the splash guard 44 is also positioned along the annular lip 24 of the brewing funnel 20, but at a position 56. Position 56 is generally equidistant from the side 50 of the brewing funnel 20 where the handle 36 is attached and from the side 52 of the brewing funnel 20 opposite of where the handle 36 is attached. Position 56 is opposite position 48 on the brewing funnel 20.

Figure 3:
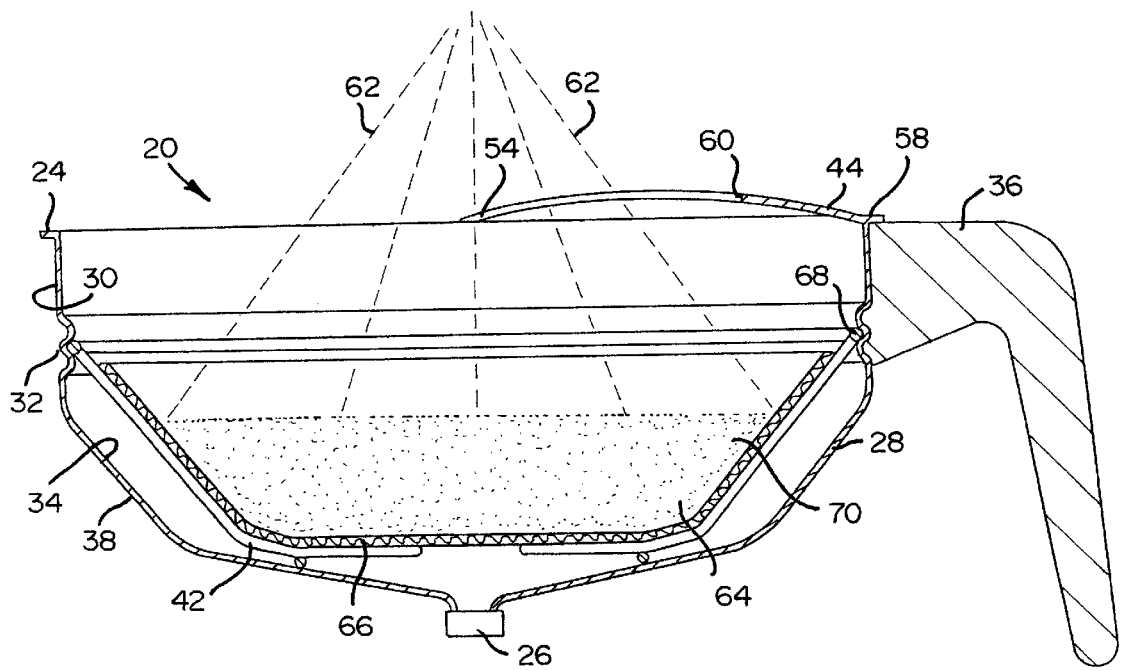
FIG. 3 is a cross-sectional side view taken along line 3—3 in FIG. 1 of the beverage brewing funnel displaying hot water being sprayed into the brewing funnel and over the brewing substance.

The splash guard 44 has an outside edge 58 and an inside edge 60. The outside edge 58 of the splash guard 44 extends from position 48 along the annular lip 24 to position 56. The outside edge 58 of the splash guard 44 is attached to or extends from the annular lip 24. The inside edge 60 of the splash guard 44 extends from position 48 over the mouth 22 of the brewing funnel 20 to position 56. As seen in FIG. 3, the inside edge 60 does not extend over the mouth 22 of the brewing funnel 20 so as to interfere with hot water 62 being sprayed into the brewing funnel 20 infusing brewing substance 64. The inside edge 60 also does not extend over the mouth 22 of the brewing funnel 20 so as to interfere with the placement of a filter 66 and a brewing substance 64 within the brewing funnel 20. The mouth 22 extending from the inside edge 60 to the opposing portion of the rim 24 allows for access to the funnel 20 generally in the same manner as a funnel without the guard 44.

Figure 4:
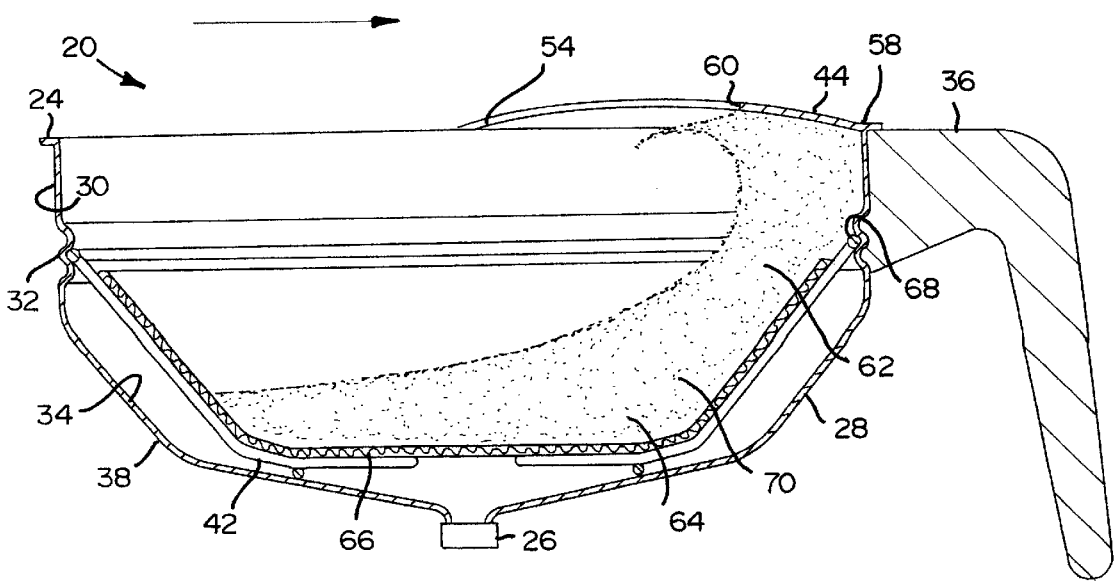
FIG. 4 is a cross-sectional side view taken along line 4—4 in FIG. 1 of the beverage brewing funnel depicting the splash guard deflecting a slurry of hot water, brewing substance and brewed beverage back into the brewing funnel when the brewing funnel is removed from the brewing apparatus.

The inside edge 60 of the splash guard 44 may be positioned above the outside edge 58 and the annular lip 24 of the brewing funnel 20. As best illustrated in FIGS. 3 and 4, a preferred embodiment of the splash guard 44 is formed with an arched shape with the inside edge 60 being situated above the outside edge 58. As best illustrated in FIG. 2, the splash guard 44 as defined by positions 48, 56, the outside edge 58 and the inside edge 60, is also generally having a curved shape. Finally, the splash guard 44 does not extend to such a height so as to interfere with the placing of the brewing funnel 20 within the brewing apparatus.

Directing attention to FIG. 3, in normal operation, the brewing funnel 20 is situated within a brewing apparatus with the handle 36 in a position such that the brewing funnel 20 can easily be removed from the brewing apparatus when the brewing process is complete. A filter support 42 is positioned within the mouth 22 of the brewing funnel 20. The annular bead 68 of the filter support 42 engages the annular groove 32 of the brewing funnel 20 in order to retain the filter support 42 to the brewing funnel 20. A filter 66 is situated within the brewing funnel 20, resting on top of the filter support 42. Brewing substance 64 is deposited in the filter 66 in the brewing funnel 20. During the brewing process, hot water 62 is sprayed from a nozzle of the brewing apparatus through the mouth 22 of the brewing funnel 20 and onto the brewing substance 64. The hot water 62 and the brewing substance 64 begin the process of infusion whereby the hot water 62 and the brewing substance 64 mix together to form a liquid brewed beverage 70. As the brewed beverage 70 is formed, it drains from the brewing funnel 20 through the drain aperture 26 and into a carafe. In a normal operation, the brewing funnel 20 remains in the brewing apparatus throughout the brewing cycle, i.e., until all of the brewed beverage 70 has drained from the brewing funnel 20 via the drain aperture 26 and into the carafe.

As seen in FIG. 4, the addition of the novel splash guard 44 to the brewing funnel 20 prevents a slurry of hot water 62, brewing substance 64 and brewed beverage 70 from splashing over the annular lip 24 of the brewing funnel 20 and toward the handle 36 if the brewing funnel 20 is removed prior to the completion of the brewing process. When the hot water 62, brewing substance 64 and brewed beverage 70 develop a degree of momentum toward the handle 36 when the brewing funnel 20 is removed from the brewing apparatus via the handle 36 prior to the end of the brewing process, the hot water 62, brewing substance 64 and brewed beverage 70 are redirected and deflected into the mouth 22 by the splash guard 44. The splash guard 44 effectively stops the hot water 62, brewing substance 64 and brewed beverage 70 from splashing over the annular lip 24 of the brewing funnel 20.

The invention is claimed as follows:

1. A brewing funnel for retaining a brewing substance and water during an infusion process and draining a brewed beverage product therefrom, comprising:
    at least one sidewall defining a cavity therein, a drain aperture in a bottom surface of said brewing funnel, and a rim situated along an upper edge of said sidewall, said rim defining a mouth;
    a handle on an outside surface of said brewing funnel; and
    a splash guard attached to said sidewall generally adjacent to said handle, said splash guard extending over at least a portion of said mouth of said brewing funnel proximate to said handle.

2. A brewing funnel as defined in claim 1, wherein said splash guard is generally arcuate relative to said mouth, whereby said splash guard directs a quantity of said water and said brewing substance back into said brewing funnel.

3. A brewing funnel as defined in claim 2, wherein said splash guard is generally curved.

4. A brewing funnel as defined in claim 1, wherein said splash guard is defined to not impede said mouth from receiving water for infusing said brewing substance.

5. A brewing funnel as defined in claim 1, wherein said splash guard does not impede the placement of materials through said mouth of said brewing funnel.

6. A brewing funnel as defined in claim 1, wherein said splash guard is detachable from said brewing funnel.

7. A brewing funnel as defined in claim 1, wherein said splash guard is permanently affixed to said brewing funnel.

8. A brewing funnel as defined in claim 1, wherein said splash guard is formed of a heat resistant material.

9. A splash guard for attachment to a brewing funnel, said brewing funnel defining a cavity, said splash guard comprising: a structure extending inwardly over at least a portion of said cavity of said brewing funnel, said structure attached to said brewing funnel generally adjacent to a handle connected to said brewing funnel.

10. A splash guard as defined in claim 9, wherein said structure is arcuate relative to said brewing funnel, whereby said structure is capable of directing a portion of water and a brewing substance retained in said brewing funnel back into said brewing funnel upon removal of said brewing funnel from a brewing apparatus prior to complete drainage.

11. A splash guard as defined in claim 10, wherein said structure is generally curved.

12. A splash guard as defined in claim 9, wherein said structure does not impede said cavity from receiving water for infusing said brewing substance positioned within said brewing funnel.

13. A splash guard as defined in claim 9, wherein said structure does not impede the placement of materials into said cavity of said funnel.

* * * * *